(12) United States Patent
Arritt et al.

(10) Patent No.: US 7,541,078 B1
(45) Date of Patent: Jun. 2, 2009

(54) FIBER COMPOSITE OVER-WRAP FOR A CRYOGENIC STRUCTURE

(75) Inventors: Brandon J. Arritt, Centerville, OH (US); Christopher Paul, Albuquerque, NM (US)

(73) Assignee: The United States of America as represented by the Secretary of the Air Force, Washington, DC (US)

(\*) Notice: Subject to any disclaimer, the term of this patent is extended or adjusted under 35 U.S.C. 154(b) by 628 days.

(21) Appl. No.: 10/841,329

(22) Filed: May 10, 2004

(51) Int. Cl.
| | |
|---|---|
| *B29D 22/00* | (2006.01) |
| *F16L 11/04* | (2006.01) |
| *F17C 1/06* | (2006.01) |
| *F16L 9/14* | (2006.01) |
| *B32B 27/12* | (2006.01) |

(52) U.S. Cl. ............... 428/36.91; 428/34.1; 428/300.4; 428/300.7; 220/560.04; 220/560.05; 220/560.09; 156/169; 138/153; 138/172

(58) Field of Classification Search ............... 428/36.91, 428/34.1, 300.4, 300.7; 220/560.04, 560.05, 220/560.09; 138/153, 172; 156/169, 173
See application file for complete search history.

(56) References Cited

U.S. PATENT DOCUMENTS

| | | | | |
|---|---|---|---|---|
| 3,479,786 A | * | 11/1969 | Kreier, Jr. .................. | 52/745.2 |
| 3,674,581 A | * | 7/1972 | Kalnin ......................... | 156/84 |
| 4,960,629 A | * | 10/1990 | Jarmon et al. ................ | 428/113 |
| 5,650,230 A | * | 7/1997 | Huang et al. ................. | 428/372 |
| 2003/0183638 A1 | * | 10/2003 | Minta et al. ............. | 220/560.13 |
| 2004/0020932 A1 | * | 2/2004 | Brunnhofer ............ | 220/560.12 |

FOREIGN PATENT DOCUMENTS

| | | | |
|---|---|---|---|
| FR | 2672538 | * | 8/1992 |
| JP | 61268691 | * | 5/1988 |
| JP | 04069492 A | * | 3/1992 |
| JP | 04069493 A | * | 3/1992 |

\* cited by examiner

*Primary Examiner*—Patricia L Nordmeyer
(74) *Attorney, Agent, or Firm*—James M. Skorich

(57) ABSTRACT

A structure has an inner, load bearing member and a surrounding, concentric over-wrap. The inner member is composed of a carbon composite and the over-wrap is composed of a non-carbon composite. The inner member has a negative coefficient of thermal expansion and the over-wrap has a positive coefficient of thermal expansion that is an order of magnitude greater than that of the inner member. When subjected to cryogenic temperatures, the over-wrap will shrink and apply a compressive force against the inner member, to resist the creation of microcracks in the inner member.

20 Claims, No Drawings

FIBER COMPOSITE OVER-WRAP FOR A CRYOGENIC STRUCTURE

STATEMENT OF GOVERNMENT INTEREST

The conditions under which this invention was made entitle the Government of the United States, as represented by the Secretary of the Air Force, to the entire right, title and interest therein, including foreign rights, pursuant to paragraph I(a) of Executive Order 10096.

BACKGROUND OF THE INVENTION

This invention relates to fiber composites and, more particularly, comprises a non-carbon fiber composite over-wrap for an underlying carbon fiber composite member, together with the method for applying the over-wrap to the member.

Due to their relatively high strength-to-weight ratio, carbon fiber composites are the material of choice to fabricate tanks and tubes to contain and transfer cryogenic fluids, e.g., liquid helium, hydrogen and methane. Accordingly, such composites are of particular benefit in fabricating liquid-fuel booster rockets.

A carbon fiber composite is comprised of a carbon fibers embedded in a resin. A problem inherent to the use of such composites in cryogenic applications arises from the difference in the respective coefficients of thermal expansion between the fiber and the resin.

Linear expansion of a rod due to heating is approximated by the equation:

$$L = L_0(1 + \alpha \Delta T) \quad (1)$$

where:
L is the length of the rod after being heated;
$L_0$ is the length of the rod before being heated;
$\alpha$ is the coefficient of thermal expansion for the material from which the rod is composed; and
$\Delta T$ is the temperature difference between an elevated temperature to which the rod has been heated and an initial rod temperature (a positive value indicates heating while a negative value indicates cooling).

Area expansion of a two-dimensional plate due to heating is approximated by the equation:

$$A = A_0(1 + 2\alpha \Delta T) \quad (2)$$

where:
A is the area of the plate after being heated; and
$A_0$ is the area of the plate before being heated.

Volume expansion of a container due to heating is approximated by the equation:

$$V = V_0(1 + 3\alpha \Delta T) \quad (3)$$

where:
V is the volume enclosed by the container after being heated; and
$V_0$ is the volume enclosed by the container before being heated.

The foregoing equations are approximations because the quadratic and cubic terms have been omitted in view of the typical coefficient of thermal expansion $\alpha$ being on the order of parts per million per degree Centigrade. As can be seen, the greater the coefficient of thermal expansion $\alpha$, the more a work piece will expand when heated and, conversely, contract when cooled, i.e., when $\Delta T$ is negative, assuming that $\alpha$ is a positive parameter.

A typical difference in the respective thermal expansion coefficients for the embedded fiber and the resin results in the two components expanding and contracting different amounts when the composite is heated and cooled, respectively. More particularly, resins have a coefficient of thermal expansion that is at least an order of magnitude greater than that of carbon. In addition, resins have a positive coefficient of thermal expansion, while carbon often has a negative coefficient of thermal expansion. Carbon fibers will thus expand when cooled and contract when heated, just the opposite of the resin in which the fibers are embedded. The foregoing factors serve to dramatically increase the thermally induced stress and strain in a carbon fiber composite.

When coupled with the brittleness of the resin caused by cryogenic temperatures, the thermally induced stress and strain cause microcracks in the resin of a carbon fiber composite. Thermal cycling of the composite exacerbates the problem by creating additional cracks with each cycle, and by extending and widening the existing fissures. This eventually causes the structure to leak or to fail when loaded.

It follows that there is a need in the art for a carbon fiber composite structure that will not leak when communicating or storing cryogenic fluids, or fail under cryogenic conditions when under design loads, even after repeated thermal cycling. The present invention fulfills this need in the art.

SUMMARY OF THE INVENTION

Briefly, two types of composites are used to create a composite structure. One type is used for the inner, load-bearing member, and the other type is used as an over-wrap that encloses the inner member. The over-wrap composite has a positive coefficient of thermal expansion substantially greater that that of the composite in the inner member so that, under cryogenic conditions, the over-wrap will shrink and apply a compressive force against the inner member. The compressive force resists the creation of microcracks when the inner member is subjected to cryogenic thermal cycling.

DETAILED DESCRIPTION

A structure for containing or communicating fluids, e.g., a vessel or hollow tube, is comprised of two different and distinct concentric members: an inner, load-bearing member and an over-wrap that is in contact with the outer surface of the inner member and, as much as possible, encloses the inner member. Although the salutary effects of the over-wrap are enhanced in proportion to the percentage of the inner member surface area covered by the over-wrap, it is to be understood that, due to appendages, the shape of the inner member, or design constraints, the enclosure of the inner member may be only partial.

Both members are fabricated from composites. The over-wrap is a composite having a positive coefficient of thermal expansion by virtue of including non-carbon fibers such as glass so that it contracts when cooled. More specifically, the over-wrap composite could include fibers composed of either C-glass, D-glass, boron, SCS-6, NEXTEL™ 720 (manufactured by 3M Corporation) or KEVLAR® (manufactured by E. I. DuPont de Nemours and Company). The inner member is composed of a composite having a negative coefficient of thermal expansion by virtue of including carbon fibers having a negative coefficient of thermal expansion, e.g., T300, IM6, or P11, which results in the inner member having the desired high strength-to-weight ratio.

Any one of a number of resins known to those skilled in the relevant art may be used to embed the fibers, e.g., EPON®

9310, EPON® 9360 (Epon® 0 is a registered trademark owned by Miller-Stephenson Chemical Company, Inc.) or CYCOM® 977-2 (produced by Cytec Industries, Inc.). However, the resin in the over-wrap should cure at a temperature lower than the glass transition temperature for the resin of the inner member. This will ensure that the inner resin does not re-liquefy and flow, which could reset the shape and change the properties of the inner structure. Although the respective coefficients of thermal expansion of the composites will vary as a function of the particular fibers and resins that are used, the magnitude of the coefficient of thermal expansion of the over-wrap should be an order of magnitude greater than that of the carbon composite comprising the inner member.

The inner member is formed using methods well known to those skilled in the art. Next, a layer of mold release is applied to the exterior surface of the inner member. Two to five layers of the over-wrap are then applied around the inner member by filament winding.

The over-wrap has relatively low resin content because it is intended that the fiber composition be the primary determinant of its coefficient of thermal expansion, e.g., the volume of fiber should comprise at least 70% of the total volume of the over-wrap. Moreover, the over-wrap is not intended to resist the load on the structure or communicate the fluid. Thus, the creation of cracks in the over-wrap due to cryogenic cycling will not interfere with its purpose, as will be hereinafter explained.

When the structure is exposed to cryogenic temperatures, the inner member cools. Thermal stress and strain are created by contraction of the resin, which has a positive coefficient of thermal expansion, and an opposing lengthening of the embedded carbon fibers, which, as previously noted, have a negative coefficient of thermal expansion. However, the over-wrap, having a positive coefficient of thermal expansion, contracts. The resultant shrinking of the over-wrap applies a compressive force against the inner member.

This compressive force opposes the lengthening of the carbon fibers in the inner member, and typically keeps the thermally and mechanically induced stresses in the inner composite below the critical level that could otherwise cause microcracks to form in the resin. Furthermore, should microcracks nonetheless form, whether from thermal cycling or mechanical loading, the compressive load on the inner member resists their propagation and lateral expansion.

The foregoing mitigates the creation of a leak path for a contained cryogenic fluid where the inner member comprises a tube for communicating cryogenic fluid or a vessel for storing it. Where the inner member is a load bearing structural member, the invention's resistance to the formation of microcracks will allow the inner member to retain its ability to resist its design load.

It is to be understood that the preceding is merely a detailed description of an embodiment of this invention and that numerous changes to the disclosed embodiment can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. A fiber composite structure for containing a cryogenic fluid comprising:
    an inner member;
    the inner member being comprised of a vessel;
    an over-wrap enclosing a significant portion of the inner member; and
    the inner member being comprised of an inner member composite having an inner member coefficient of thermal expansion that is negative and the over-wrap being comprised of an over-wrap composite having an over-wrap coefficient of thermal expansion that is positive, whereby
    the over-wrap applies a compressive force against the inner member when the over-wrap and the inner member are subjected to a cryogenic temperature.

2. A fiber composite structure as defined in claim 1 wherein the inner member is a hollow tube.

3. A fiber composite structure as defined in claim 1 wherein the inner member and the over-wrap are concentric.

4. A fiber composite structure as defined in claim 1 wherein:
    the inner member has an outer surface;
    the outer surface has an outer surface area; and
    the over-wrap being in contact with at least half of the outer surface area.

5. A fiber composite structure as defined in claim 1 wherein:
    the over-wrap has an over-wrap volume; and
    the over-wrap composite includes over-wrap fibers having an aggregate fiber volume comprising at least 70% of the over-wrap volume.

6. A fiber composite structure as defined in claim 1 wherein:
    the inner member composite includes carbon fibers; and
    the over-wrap fibers are composed of a non-carbon material.

7. A fiber composite structure as defined in claim 1 wherein:
    the over-wrap composite is comprised of the over-wrap fibers embedded in an over-wrap resin having a resin cure temperature;
    the inner member comprised is comprised of inner member fibers embedded in an inner member resin having a glass transition temperature; and
    the resin cure temperature is lower than the glass transition temperature.

8. A fiber composite structure as defined in claim 1 wherein the inner member coefficient of thermal expansion has an inner member absolute value and the over-wrap coefficient of thermal expansion has an absolute value that is an order of magnitude greater than the inner member absolute value.

9. A fiber composite structure as defined in claim 1 further comprising a layer of mold release lying in between the inner member and the over-wrap.

10. A fiber composite structure for resisting formation and propagation of microcracks when subjected to cryogenic thermal cycling, comprising:
    an inner member fabricated of an inner member fiber composite, and having an outer surface;
    the inner member being comprised of a vessel;
    an over-wrap fabricated from an over-wrap fiber composite, for enclosing a substantial portion of the outer surface, whereby
    at least a substantial part of the inner member is enclosed by the over-wrap;
    a layer of mold release lying in between the outer surface and the over-wrap;
    the over-wrap having an over-wrap coefficient of thermal expansion and the inner member having an inner member coefficient of thermal expansion; and
    the over-wrap coefficient of thermal expansion being greater than the inner member coefficient of thermal expansion, whereby the over-wrap applies a compressive force against the inner member when the over-wrap and the inner member are subjected to a cryogenic temperature.

11. A fiber composite structure as defined in claim 10 wherein the inner member is comprised of a hollow tube.

12. A method for forming a fiber composite vessel for cryogenic fluids comprising:
   forming an inner member from an inner member fiber composite having a negative coefficient of thermal expansion;
   the inner member being a vessel; and
   enclosing a significant portion of the inner member with an over-wrap formed from an over-wrap fiber composite having a positive coefficient of thermal expansion, whereby
   the over-wrap applies a compressive force against the inner member when the over-wrap and the inner member are subjected to a cryogenic temperature.

13. A method for forming a fiber composite vessel as recited in claim 12 wherein the inner member is comprised of a hollow tube.

14. A method for forming a fiber composite vessel as recited in claim 12 wherein the inner member and the over-wrap are concentric.

15. A method for forming a fiber composite vessel as recited in claim 12 further comprising:
   forming the inner member composite by embedding carbon fibers in an inner member resin having a glass transition temperature; and
   forming the over-wrap composite by embedding non-carbon fibers in an over-wrap resin having a resin cure temperature that is lower than the glass transition temperature.

16. A method for forming a fiber composite vessel as recited in claim 12 wherein:
   the over-wrap has an over-wrap volume and the non-carbon fibers have an aggregate fiber volume; and further comprising
   forming the over-wrap with the aggregate fiber volume comprising at least 70% of the over-wrap volume.

17. A method for forming a fiber composite vessel as recited in claim 12 further comprising applying a layer of mold release to the inner member before enclosing the inner member with the over-wrap.

18. A method for forming a structure for resisting formation and propagation of microcracks in an inner member of the structure when the structure is subjected to cryogenic thermal cycling, comprising:
   forming a vessel as the inner member from an inner fiber composite including carbon fibers;
   applying a layer of mold release to the inner member, and then;
   over-wrapping at least a substantial part of the inner member with an over-wrap fiber composite including non-carbon fibers having a positive coefficient of thermal expansion.

19. A method for forming a structure as recited in claim 18 wherein the inner fiber composite has a negative coefficient of thermal expansion.

20. A method for forming a structure as recited in claim 18 wherein the inner member is comprised of a hollow tube.

* * * * *